(12) United States Patent
Schmidt

(10) Patent No.: US 6,533,078 B2
(45) Date of Patent: Mar. 18, 2003

(54) BRAKING DEVICE FOR A BICYCLE

(75) Inventor: Frank Schmidt, Schweinfurt (DE)

(73) Assignee: SRAM Deutschland GmbH, Schweinfurt (DE)

( * ) Notice: Subject to any disclaimer, the term of this patent is extended or adjusted under 35 U.S.C. 154(b) by 0 days.

(21) Appl. No.: 09/942,807

(22) Filed: Aug. 30, 2001

(65) Prior Publication Data

US 2002/0066624 A1 Jun. 6, 2002

(30) Foreign Application Priority Data

Sep. 1, 2000 (DE) .......................... 100 43 005

(51) Int. Cl.[7] .................................................. B62L 1/00
(52) U.S. Cl. ....................................................... 188/26
(58) Field of Search .............................. 188/24.11, 17, 188/18, 26

(56) References Cited

U.S. PATENT DOCUMENTS 4,179,013 A * 12/1979 Kine ........................... 188/26
4,405,180 A    9/1983 Butz ........................... 301/111

FOREIGN PATENT DOCUMENTS

| DE | 31 13 439  | 10/1982 | ............ B60B/27/02 |
| DE | 39 25 714  | 2/1991  | ............ B62L/1/00  |
| DE | 195 36 157 | 4/1997  | ............ B62L/1/00  |

* cited by examiner

Primary Examiner—Christopher P. Schwartz
(74) Attorney, Agent, or Firm—Cohen, Pontani, Lieberman & Pavane

(57) ABSTRACT

A braking device for a hub with an axle for a running wheel of a bicycle includes a brake carrier plate and an extension arm arranged on the brake carrier plate. The hub is connectable with the braking device via the axle at a drop-out end of a frame part of the bicycle. The brake carrier plate is connectable to a fastening element for a caliper of a disk brake on the frame part for the transmission of brake reaction forces via the extension arm. An adaptor is arranged at the fastening element, the adaptor allowing itself to be pushed together with the extension arm as soon as the axle of the hub is pushed into the drop-out end of the frame part for the mounting of the running wheel.

20 Claims, 2 Drawing Sheets

BRAKING DEVICE FOR A BICYCLE

BACKGROUND OF THE INVENTION

1. Field of the Invention

The invention relates to the attachment of a braking device, in particular a drum brake, to a frame part of a bicycle.

2. Description of the Related Art

The attachment of a prior art drum brake to the frame part of a bicycle is usually performed after the drum brake has been assembled with a hub of a bicycle wheel via an axle of the hub connected on the frame part of the bicycle. An extension arm connected to the brake for dissipating brake reaction forces is likewise fastened on the frame part after the extension arm has been brought into the correct position in relation to the frame part. One example of a prior art drum brake with an extension arm is described in German patent application DE 195 36 157.1 A1. In this reference, the extension arm has a support which is fastened on the frame part of the bicycle by a bolted joint or has a bracket or the like, which can be joined to the frame part. It is always the aim of such a construction to create an extension arm which is suitable for attachment to all different types of frame parts (i.e., universal attachment) and, moreover, can as far as possible also be attached to both running wheels of the bicycle.

SUMMARY OF THE INVENTION

The subject matter of the present invention relates to a specific attachment of a braking device on a bicycle frame part which is specifically designed for a disk type of braking device. That is, the present invention concerns the segment of bicycles where a disk brake is mounted on both running wheels, or at least on the front wheel. In contrast, the prior art focusses on the design of a universal attachment for the extension arm of braking devices.

Equipping this type of bicycle with drum brakes as it is initially fitted out, or at least by retrofitting, is the object of the present invention. The present invention dispenses with the technically demanding mounting step of positioning the extension arm with respect to the frame part before the axle of the hub is fastened in the drop-out ends of the bicycle.

In general, the manufacturers of bicycles with disk brakes now use a configuration for dissipating the reaction force produced during braking to a fastening element which is arranged on the frame part in the vicinity of one of the drop-out ends of the bicycle frame. The fastening element is a metal plate with two bores, at which there can be fastened a caliper which has brake blocks which are pressed against a brake disk bolted to the running wheel. During the braking of the brake disk and consequently of the running wheel, the brake reaction force is transmitted from the brake blocks via the caliper to the fastening element and consequently to the frame part.

According to the invention, to retrofit a drum brake on a bicycle designed for disk brakes, an adaptor is attached at one of the bores of the fastening element. The adaptor is preferably a simple-to-produce rotationally symmetrical part and has a groove in which a recess of an extension arm on the drum brake can engage.

According to the present invention, a braking device which comprises a brake carrier with brake shoes and an extension arm is brought together with a hub to form a structural unit. The hub has an axle and the structural unit allows itself to be fastened on the fastening part of the bicycle both by the axle being pushed into drop-out ends on the frame part of the bicycle and by the extension arm simultaneously being pushed into the adaptor. The mounting and removal of the running wheel are consequently reduced to the pushing-in described above and, in addition, tightening of axle nuts on the axle. No additional fastening operations at the joint connecting the extension arm to the adaptor are required. The recess on the extension arm is preferably designed such that it tapers in a funnel-shaped manner to make the joint between the extension arm and the adaptor virtually free from play. Needless to say that, as on all brakes, a remote control for actuating the braking device must be fitted here.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
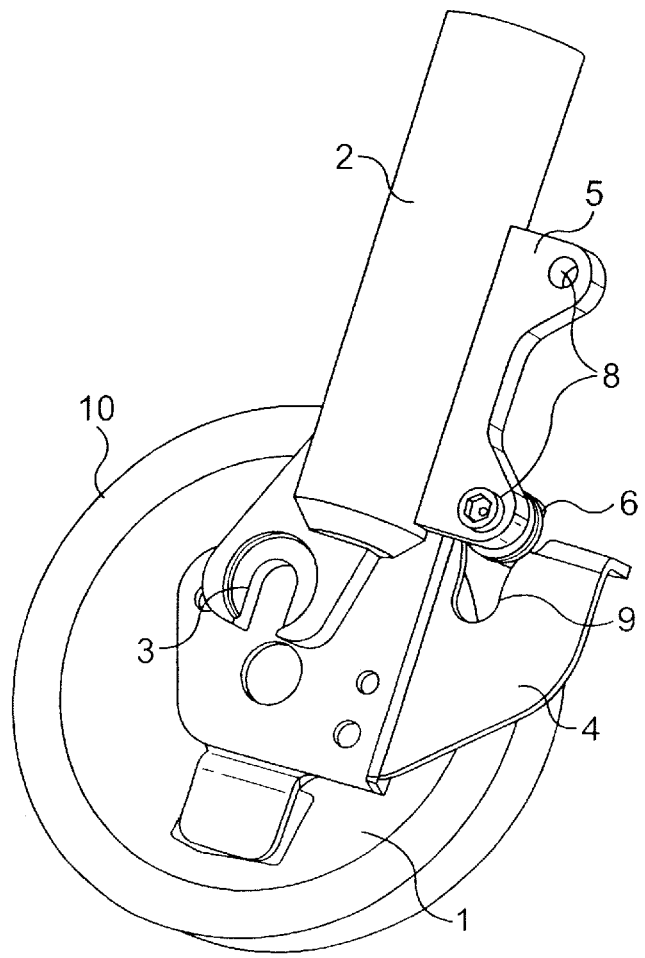
FIG. 1 is a perspective view of a brake carrier plate for a drum brake with an extension arm in a mounting position in front of a frame part having a fastening element and an adaptor according to an embodiment of the present invention.

A braking device according to an embodiment of the present invention includes a brake carrier plate 1 and an extension arm 4 attached thereto. The extension arm 4 may be connected as an integral part of the brake carrier plate 1 or may be a separate part that is connected to the brake carrier plate 1 by any suitable connection such as bolts, screws, rivets, or welding. For the dissipation of brake reaction forces to a frame part 2, the extension arm 4 includes a first guide 9 which engages an adaptor 6 arranged on a fastening element 5 mounted on the frame part 2. The first guide 9 of the extension arm 4, which may comprise a recess, is joined to the fastening element 5 via the adaptor 6. The adaptor 6 includes a second guide 7 configured to engage the first guide 9 of the extension arm 4. The adaptor 6 may comprise a rotationally symmetrical part, which simplifies the arrangement of the guide 7 to the extent that it may comprise a simple groove which can be made by either a cutting or a non-cutting machining operation.

Figure 2:
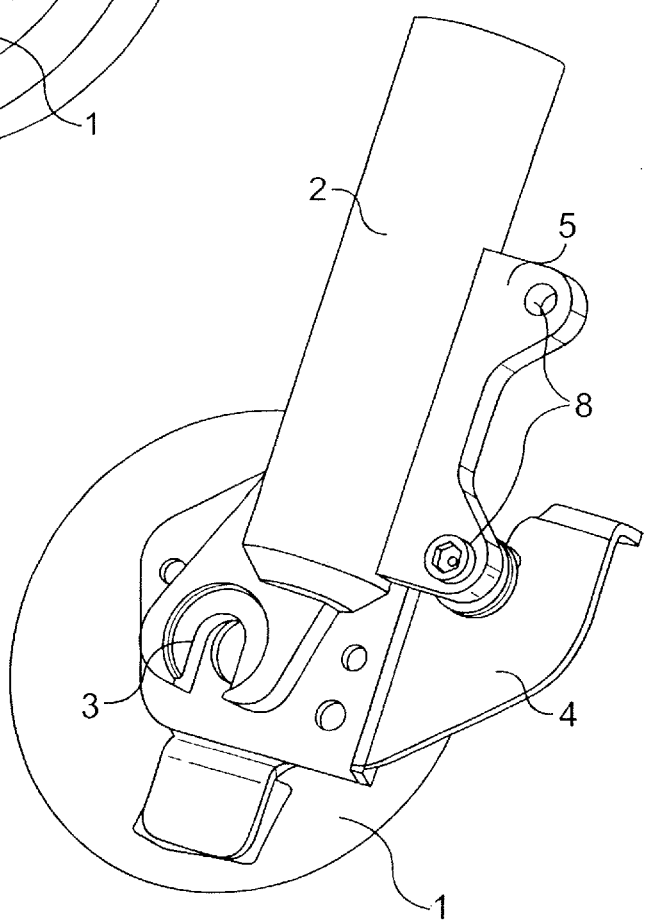
FIG. 2 is a perspective view of the brake carrier plate and frame part of FIG. 1 in the final mounted position.

FIG. 1 depicts the position of the brake carrier plate 1 in connection with a hub (shown schematically) in relation to the frame part 2 before final mounting. FIG. 2 shows the brake carrier plate 1, and consequently the braking device, in the final mounted position. An axle (not shown in these figures) of the hub protrudes through a central bore of the brake carrier plate 1 and can be pushed into drop-out ends 3 of the frame part 2 (FIG. 2 shows the positions of the brake carrier plate 1 and the drop-out ends 3 in which the hub axle may be inserted). While the brake carrier plate 1 is moved into the position shown in FIG. 2, the recess 9 is simultaneously inserted into the groove 7 of the adaptor 6.

The fastening element 5 comprises a sheet-metal part welded to the frame part 2 and has two bores 8. The fastening element 5 may be a part of the bicycle frame part 2 that is specifically designed for the fastening of a caliper for disk brakes. Accordingly, the present invention specifically includes a brake assembly that is to be retrofitted on a bicycle frame designed for receiving a caliper of a disk brake.

Figure 3:
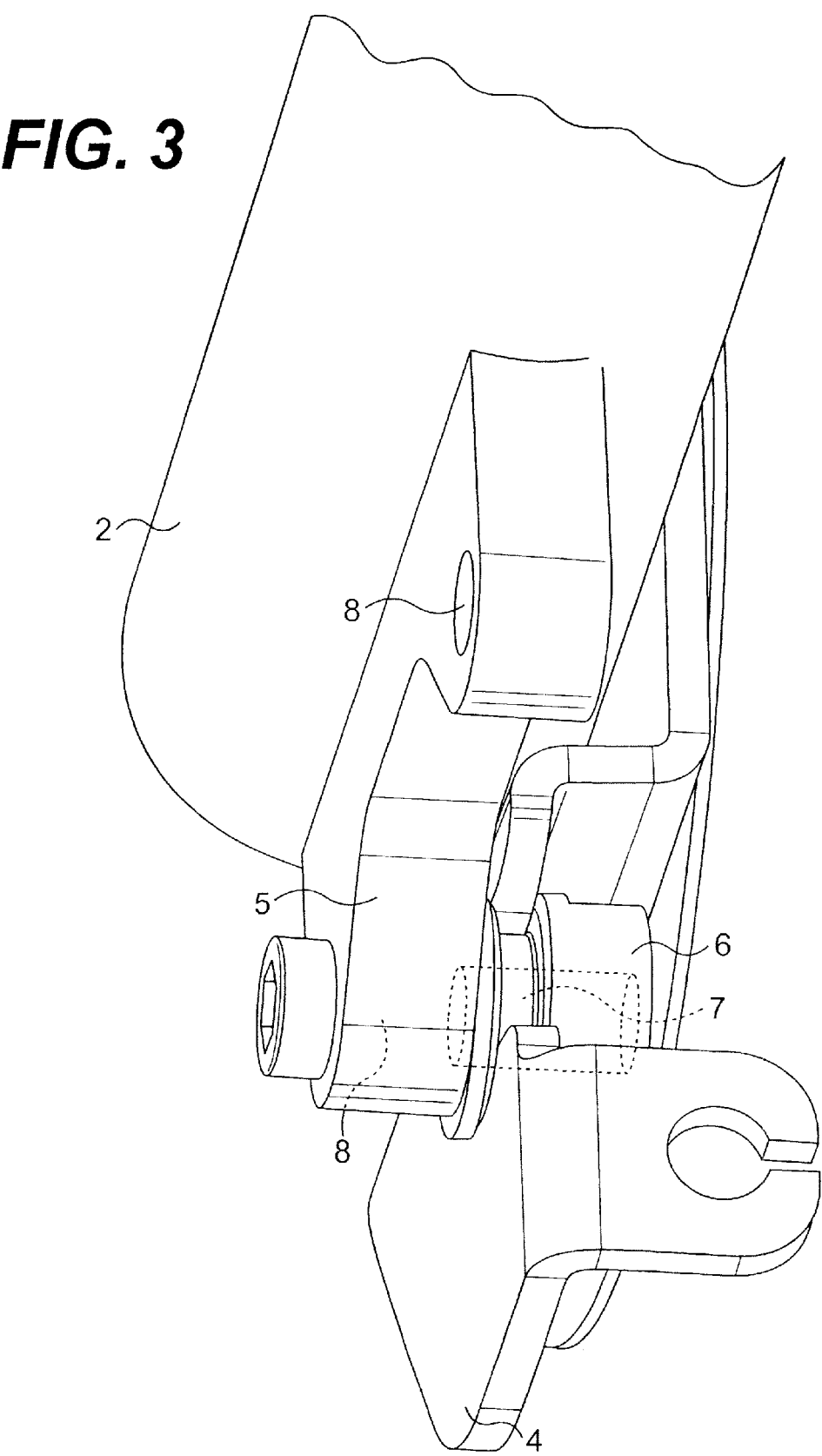
FIG. 3 shows the joining position of the extension arm with the adaptor on the fastening element in a perspective representation.

FIG. 3 clearly shows how the adaptor 6 is bolted at one of the two bores 8 and how the recess 9 has been pushed into the guide 7 which is designed as a groove. The brake reaction torque during braking is be transmitted to the frame part 2, provided that the hub with the braking device has been bolted as a structural unit by axle nuts to the frame part 2 at the drop-out ends 3 of the frame part 2.

In a preferred embodiment, the brake carrier plate 1 is a brake carrier plate for a drum brake and carries brake shoes (not shown). Furthermore, the frame part 2 is preferably a front fork of a bicycle. However, the frame part 2 may also comprise any other frame part of any other type of vehicle having drop-out ends 3 for receiving the hub axles.

The advantage of the invention lies in the exchangability of running wheels with brake disks for disk brakes and those with drum brakes; furthermore, the advantage lies in the simplified mounting of the running wheels with a drum brake, which closely resembles that of running wheels with brake disks without an extension arm. The braking device and the adaptor may be sold as a kit for retrofitting the braking device on a bicycle designed for disk brakes.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. In a vehicle having a frame part and a wheel having a hub and an axle, the frame part having drop-out ends for receiving the axle of the hub and a fastening element connected to the frame part, a braking device comprising:
    a brake carrier plate movable to a final mounting position relative to said vehicle frame part and being connectable to the hub;
    an extension arm connected to said brake carrier plate; and
    an adaptor arranged at said fastening element such that said extension arm connects with said adaptor as said brake carrier plate is moved into the final mounting position,
    wherein the fastening element has two bores and is designed for receiving a caliper of disk brake, said adaptor being connected to said fastening element via at least one of the two bores.

2. The braking device of claim 1, wherein said extension arm includes a first guide and said adaptor includes a second guide, the first and second guides configured to be engageable with each other as said extension arm connects with said adaptor.

3. The braking device of claim 2, wherein said first guide is a recess engageable in said second guide at a connection between said adaptor and said second guide during the mounting of the braking device to the final mounting position.

4. The braking device of claim 3, wherein said adaptor is a rotationally symmetrical part and said second guide comprises a peripheral groove.

5. The braking device of claim 3, wherein said recess tapers such that said recess is shaped for eliminating play at a joint formed by the connection.

6. The braking device of claim 1, wherein said adaptor is arranged at the one of the two bores that is closer to the drop-out end of said frame part than the other of said two bores.

7. The braking device of claim 1, wherein said braking device is a drum brake and the frame part is a front wheel fork of a bicycle.

8. A kit for retrofitting a braking device on a vehicle designed for receiving disk brakes, the vehicle having a frame part having drop-out ends and a fastening element, the vehicle further including a hub of a wheel having an axle, the braking device being connectable to the hub via the axle at the drop-out ends of the frame part, said kit comprising:
    a brake carrier plate having an extension arm, said brake carrier plate being connectable to the hub via the axle at the drop-out ends of the frame part; and
    an adaptor connectable to the fastening element on the frame part such that the extension arm connects with the adaptor for transmission of braking forces when the brake carrier plate is mounted with the hub and axle at the drop-out ends of the frame part,
    wherein said kit is for retrofitting the braking device on a vehicle with a fastening element having two bores designed for receiving a disk brake caliper, said adaptor being connectable to the fastening element via at least one of the two bores.

9. The braking device of claim 8, wherein said extension arm includes a first guide and said adaptor includes a second guide, the first and second guides configured to be engageable with each other as said extension arm connects with said adaptor.

10. The kit of claim 9, wherein said first guide is a recess engageable in said second guide at a connection between said adaptor and said second guide.

11. The kit of claim 10, wherein said adaptor is a rotationally symmetrical part and said second guide comprises a peripheral groove.

12. The kit of claim 10, wherein said recess tapers such that said recess is shaped for eliminating play at a joint formed by the connection.

13. The kit of claim 8, wherein said adaptor is arranged at the one of the two bores that is closest to the drop-out end of the frame part.

14. The kit of claim 8, wherein said kit is for retrofitting a drum brake on a front wheel fork of a bicycle.

15. A braking device for a hub of a wheel in a vehicle having a frame part with drop-out ends and a fastening part, the hub having an axle, said braking device comprising:

a brake carrier plate having an extension arm, said brake carrier plate being connectable to the hub via the axle at the drop-out ends of the frame part; and an adaptor connectable to the fastening element on the frame part such that the extension arm connects with the adaptor for transmission of braking forces when the brake carrier plate is mounted with the hub and axle at the drop-out ends of the frame part, wherein the fastening element has two bores and is designed for receiving a caliper of a disk brake, said adaptor being connected to said fastening element by at least one of the two bores.

16. The braking device of claim 15, wherein said extension arm includes a first guide and said adaptor includes a second guide, the first and second guides configured to be engageable with each other as said extension arm connects with said adaptor.

17. The braking device of claim 16, wherein said first guide is a recess engageable in said second guide at a connection between said adaptor and said second guide when said brake carrier plate being connectable to the hub via the axle at the drop-out ends of the frame part.

18. The braking device of claim 17, wherein said adaptor is a rotationally symmetrical part and said second guide comprises a peripheral groove.

19. The braking device of claim 17, wherein said recess tapers such that said recess is shaped for eliminating play at a joint formed by the connection.

20. The braking device of claim 15, wherein said braking device is a drum brake and the frame part is a front wheel fork of a bicycle.

\* \* \* \* \*

(12) INTER PARTES REEXAMINATION CERTIFICATE (0209th)
United States Patent
Schmidt

(10) Number: US 6,533,078 C1
(45) Certificate Issued: Nov. 23, 2010

(54) BRAKING DEVICE FOR A BICYCLE

(75) Inventor: Frank Schmidt, Schweinfurt (DE)

(73) Assignee: SRAM Deutschland GmbH, Schweinfurt (DE)

Reexamination Request:
No. 95/001,019, Jan. 4, 2008

Reexamination Certificate for:
Patent No.: 6,533,078
Issued: Mar. 18, 2003
Appl. No.: 09/942,807
Filed: Aug. 30, 2001

(30) Foreign Application Priority Data

Sep. 1, 2000 (DE) .......................... 100 43 005

(51) Int. Cl.
*B62L 1/00* (2006.01)

(52) U.S. Cl. .......................... 188/26; 188/17
(58) Field of Classification Search ............... 188/24.11, 188/17, 18, 26
See application file for complete search history.

(56) References Cited

U.S. PATENT DOCUMENTS 4,029,179 A 6/1977 Butz
4,215,768 A 8/1980 Seki
5,632,362 A 5/1997 Leitner

FOREIGN PATENT DOCUMENTS

| DE | 2522622 A1 | 12/1976 |
| EP | 834449 A2 | 4/1998 |
| EP | 1184276 B1 | 8/2001 |
| FR | 2246439 A1 | 5/1975 |
| GB | 1517168 A | 7/1978 |

OTHER PUBLICATIONS

"Bike Magazine," No. 63, pp. 26–28, published Jul. 1997.
Brief in support of Opposition Filed Against the Nullity Action of Shimano, Inc. dated Jul. 4, 2006.

*Primary Examiner*—Matthew C. Graham

(57) ABSTRACT

A braking device for a hub with an axle for a running wheel of a bicycle includes a brake carrier plate and an extension arm arranged on the brake carrier plate. The hub is connectable with the braking device via the axle at a drop-out end of a frame part of the bicycle. The brake carrier plate is connectable to a fastening element for a caliper of a disk brake on the frame part for the transmission of brake reaction forces via the extension arm. An adaptor is arranged at the fastening element, the adaptor allowing itself to be pushed together with the extension arm as soon as the axle of the hub is pushed into the drop-out end of the frame part for the mounting of the running wheel.

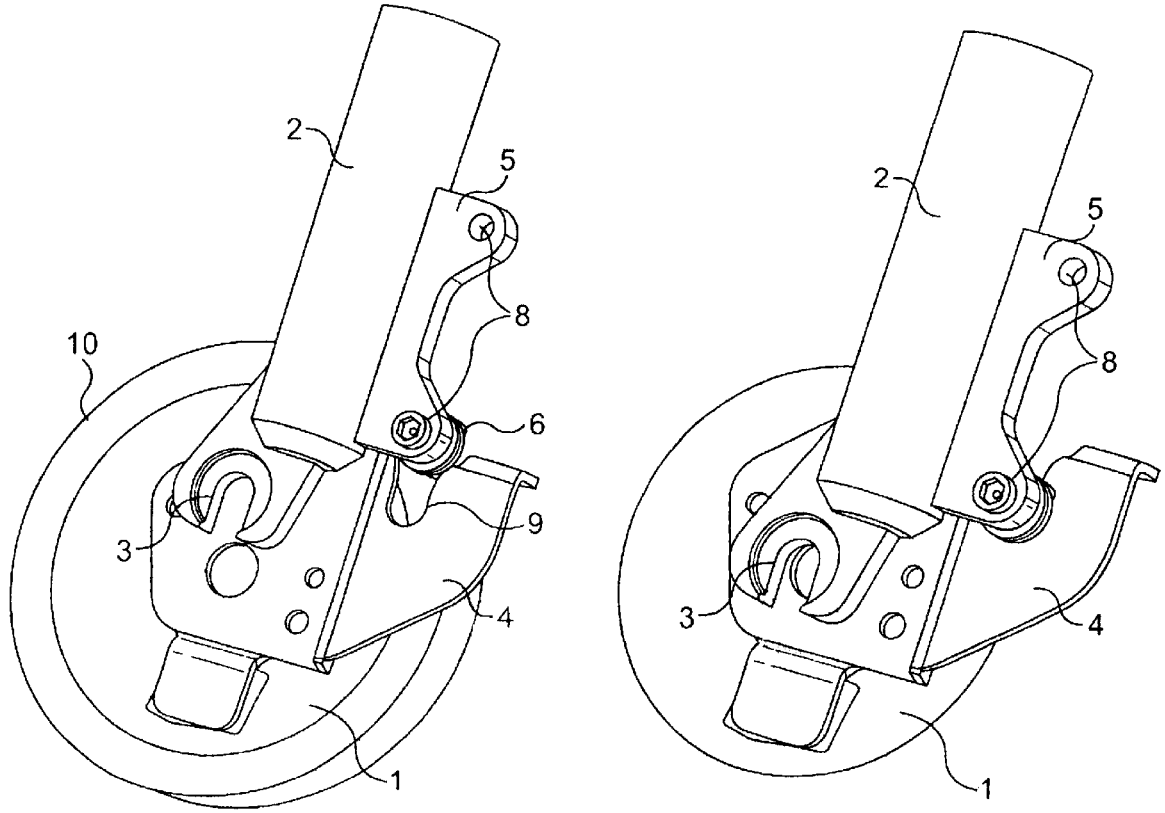

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-6, 8-13 and 15-19 are cancelled.

Claims 7, 14 and 20 are determined to be patentable as amended.

7. [The braking device of claim 1,] *In a vehicle having a frame part and a wheel having a hub and an axle, the frame part having drop-out ends for receiving the axle of the hub and a fastening element connected to the frame part, a braking device comprising:*
   a brake carrier plate movable to a final mounting position relative to said vehicle frame part and being connectable to the hub;
   an extension arm connected to said brake carrier plate; and
   an adaptor arranged at said fastening element such that said extension arm connects with said adaptor as said brake carrier plate is moved into the final mounting position,
   wherein the fastening element has two bores and is designed for receiving a caliper of disk brake, said adaptor being connected to said fastening element via at least one of the two bores
   wherein said braking device is a drum brake and the frame part is a front wheel fork of a bicycle.

14. [The kit of claim 8,] *A kit for retrofitting a braking device on a vehicle designed for receiving disk brakes, the vehicle having a frame part having drop-out ends and a fastening element, the vehicle further including a hub of a wheel having an axle, the braking device being connectable to the hub via the axle at the drop-out ends of the frame part, said kit comprising:*
   *a brake carrier plate having an extension arm, said brake carrier plate being connectable to the hub via the axle at the drop-out ends of the frame part; and*
   *an adaptor connectable to the fastening element on the frame part such that the extension arm connects with the adaptor for transmission of braking forces when the brake carrier plate is mounted with the hub and axle at the drop-out ends of the frame part,*
   *wherein said kit is for retrofitting the braking device on a vehicle with a fastening element having two bores designed for receiving a disk brake caliper, said adaptor being connectable to the fastening element via at least one of the two bores*
   wherein said kit is for retrofitting a drum brake on a front wheel fork of a bicycle.

20. [The braking device of claim 15,] *A braking device for a hub of a wheel in a vehicle having a frame part with drop-out ends and a fastening part, the hub having an axle, said braking device comprising:*
   *a brake carrier plate having an extension arm, said brake carrier plate being connectable to the hub via the axle at the drop-out ends of the frame part; and*
   *an adaptor connectable to the fastening element on the frame part such that the extension arm connects with the adaptor for transmission of braking forces when the brake carrier plate is mounted with the hub and axle at the drop-out ends of the frame part,*
   *wherein the fastening element has two bores and is designed for receiving a caliper of a disk brake, said adaptor being connected to said fastening element by at least one of the two bores,*
   wherein said braking device is a drum brake and the frame part is a front wheel fork of a bicycle.

* * * * *